H. W. BREWER.
PRINTING MACHINE.
APPLICATION FILED DEC. 11, 1917.
1,314,043.
Patented Aug. 26, 1919.
2 SHEETS—SHEET 1.
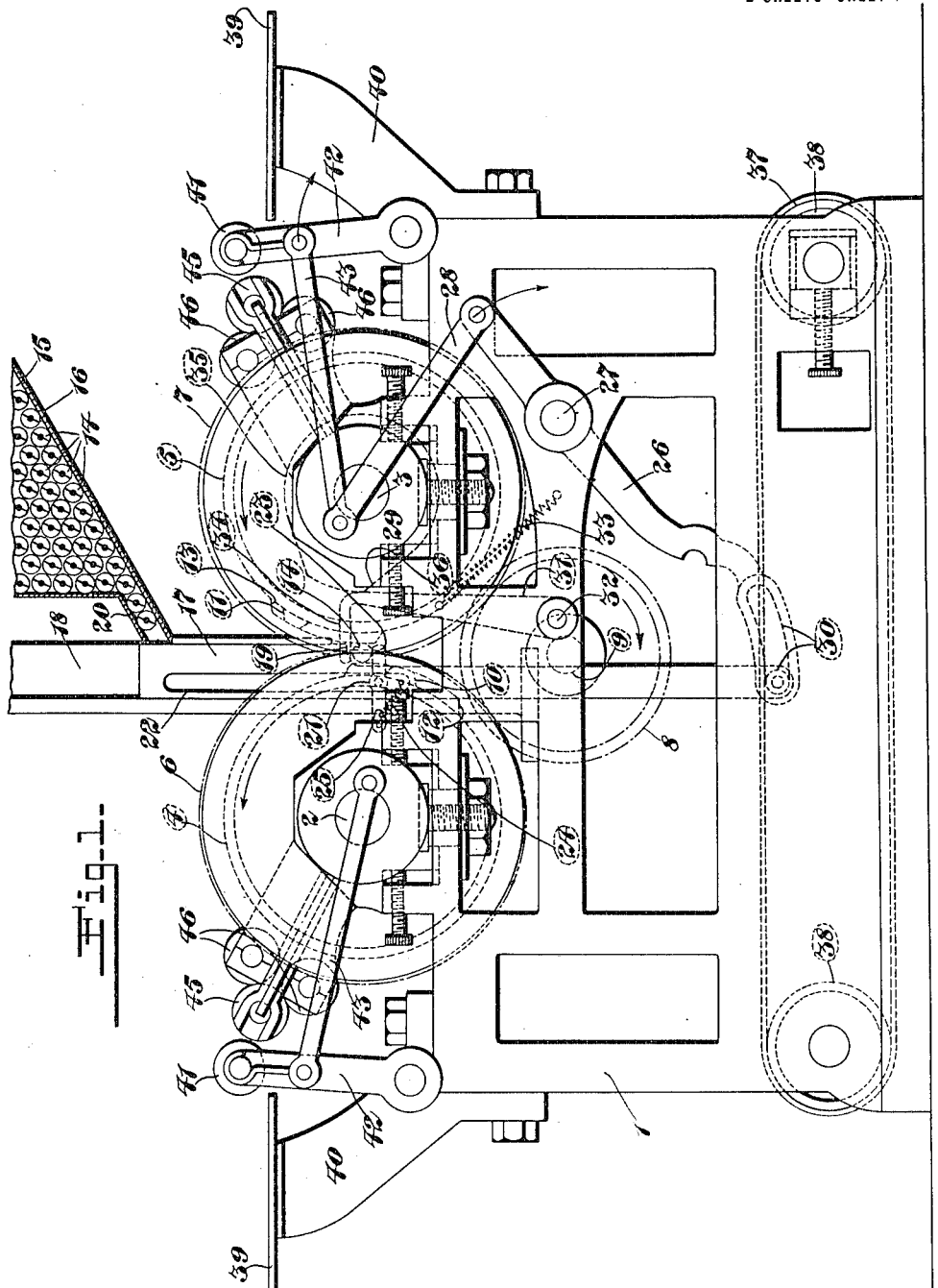
Attest.
Charles A. Becker.
Inventor.
Harry W. Brewer,
by Ripley & Kingsland
His Attorneys.

H. W. BREWER.
PRINTING MACHINE.
APPLICATION FILED DEC. 11, 1917.
1,314,043.
Patented Aug. 26, 1919.
2 SHEETS—SHEET 2.
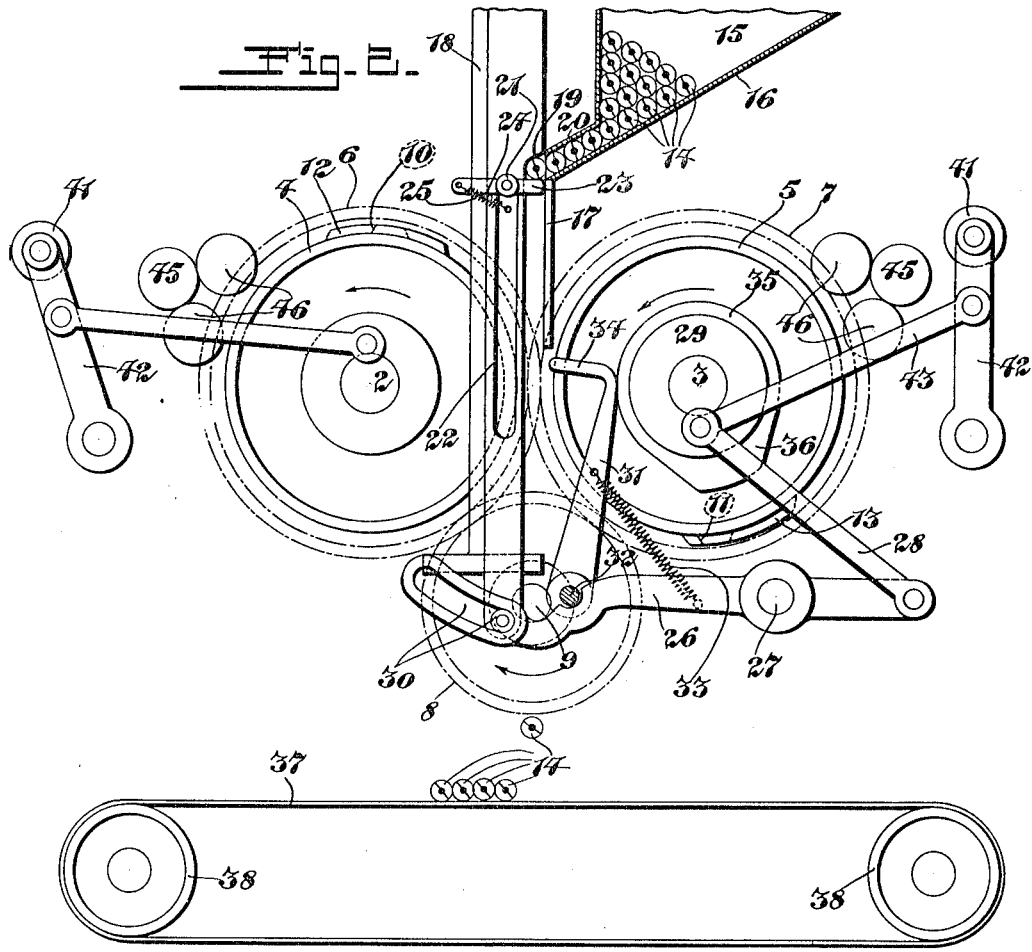
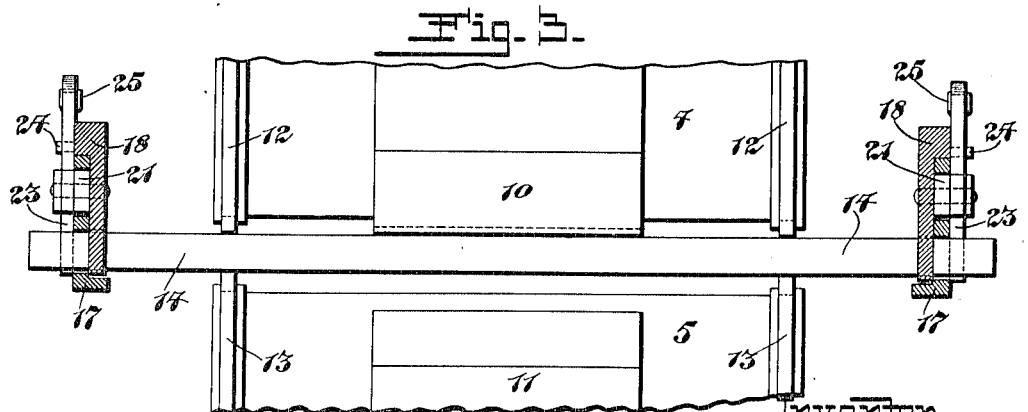
Attest
Charles A. Becker.
Inventor
Harry W. Brewer,
By Rippey & Kingsland,
His Attorneys.

UNITED STATES PATENT OFFICE.

HARRY W. BREWER, OF ST. LOUIS, MISSOURI.

PRINTING-MACHINE.

1,314,043.   Specification of Letters Patent.   Patented Aug. 26, 1919.

Application filed December 11, 1917. Serial No. 206,588.

*To all whom it may concern:*

Be it known that I, HARRY W. BREWER, a citizen of the United States, residing at the city of St. Louis, State of Missouri, have invented a new and useful Printing-Machine, of which the following is a specification.

This invention relates to improvements in printing machines, and more particularly to printing machines to print in multicolor inks on the periphery of cylindrical or polygonal objects such, for instance, as on pencils or the like.

An object of the invention is to provide a machine for printing on the periphery of cylindrical or polygonal objects in multicolor inks.

Another object of the invention is to provide a machine adapted to print upon the periphery of cylindrical or polygonal objects in multicolor inks automatically.

Another object of the invention is to provide in a printing machine of the class described means for automatically feeding the work to the printing mechanism and for discharging the work from the machine after the printing operation.

With these and additional advantages and novel features of construction in view, I have designed and combined the several operating parts in the manner hereinafter disclosed, reference being made to the accompanying drawings, in which—

Figure 1 is a side elevation of the machine embodying the invention, the parts and mechanisms being shown at the point in the cycle of operation when the printing operation is being performed.

Fig. 2 is a fragmentary view illustrating the main operative parts of the machine at the point in the cycle of operation where the printing has been accomplished and the feeding mechanism is initiated for feeding another object to the printing mechanism.

Fig. 3 is a fragmentary view taken in plan section showing the printing cylinders and the feeding mechanism in further detail, and illustrating the position of a pencil at the initiation of the printing operation.

In the embodiment of the invention as illustrated in the drawings, the machine is shown as including a main frame 1 which may be designed in any convenient manner for supporting the operating mechanism of the machine. Supported transversely of the frame are two shafts 2 and 3 respectively, said shafts being suitably journaled in bearings supported by the frame and arranged so that the axes thereof are parallel. The shaft 2 supports a revoluble cylinder 4 and the shaft 3 supports a revoluble cylinder 5. One of the shafts 2 or 3 is driven from a source of power by any suitable form of power transmission mechanism adapted to drive the shaft continuously in one direction. At one side of the machine and connected with each of the shafts 2 and 3 respectively are large gears 6 and 7. Intermediate of the gears 6 and 7 and in mesh therewith is a counter-gear 8 revolubly supported on a shaft 9 journaled in the frame of the machine. The train of gears 6, 7 and 8 constitutes power transmission mechanism for driving the shafts 2 and 3 and thereby the cylinders 4 and 5 coördinately in the same direction and at the same speed of rotation.

The periphery of each of the printing cylinders 4 and 5 is designed so that there may be attached thereto respectively the printing mats or dies 10 and 11. The mats or printing dies are preferably made of rubber and are attached to the printing cylinders transversely thereof in such a manner that the object between the cylinders will receive the impression from one of the mats or dies before coming in contact with the others; that is to say, the mats are arranged at an advance position either on the cylinder 4 or on the cylinder 5 so that the complete printing operation will be effected by the advanced mat or die before the other has reached the interval between the cylinders. At each side of the mats on the printing cylinders are raised segmental flanges 12 and 13 respectively. These flanges 12 and 13 are adapted to engage the cylindrical or polygonal object upon which the printing operation is to be performed and to hold it in alinement for the reception of the impression from the printing dies. These flanges 12 and 13 extend around the periphery of the respective printing cylinders in lateral alinement with the mats or dies and in a circumferential direction for a distance somewhat beyond the width of the dies.

In Fig. 3 of the drawing a pencil 14 is shown in position between the printing cylinders being held in alinement by the flanges 12 and 13, and the mat or printing die 10 being shown in contact with a surface of the pencil for imprinting thereon.

The feeding mechanism for advancing the work to the printing position includes a hopper 15 arranged over one of the cylinders, and supported rigidly in position by suitable connection with the frame of the machine. The hopper 15 has an inclined bottom wall 16 so that the pencils or other objects may be placed transversely in the hopper in quantities, said objects automatically adjusting themselves in position to be delivered one at a time from the lower edge of the inclined bottom wall 16 to the feeding device.

The feeding device includes upright plates 17 rigidly supported beyond the ends of the printing cylinders by the frame of the machine at each side, and slidable plates 18. Said plates 18 are arranged to move vertically against the face of the rigid plates 17. Each of the sliding plates 18 is narrowed somewhat in its lower section so that there is a shoulder 19 constituting a seat for the work when the shoulder has passed into alinement with the upper edge of the hopper chute 20. A boss 21 is formed on the outer face of each of the plates 18 at a point just below the shoulder 19, said boss extending through a slot 22 in the stationary plate. A detent member, in the form of a centrally fulcrumed lever 23, is pivoted upon each boss 21, one end of said lever constituting a support for engaging with the object delivered from the chute of the hopper between the lower face of the shoulder 19 and the upper face of said arm of the lever. The lever 23 is normally held in horizontal position by a spring 24 which tends to actuate the lever 23 against a stop 25 projecting from the outer face of the plate 18. The sliding plates 18 are reciprocated vertically through actuating connections comprising a swinging arm 26 pivoted at 27 and connected with each of said plates, and links 28 having their lower ends pivoted to the upper end of said arms and connected at their other end with a disk 29 on the shaft 3. Said arms 26 at their lower ends are connected with the plates 18 by a roller and slot connection 30. It is obvious that the actuating mechanism just described during each cycle of the printing cylinder will impart to the sliding plate 18 one complete vertical reciprocation.

In Fig. 2 the parts are shown in the positions which they occupy when the sliding plate has reached the limit of the upstroke. When in this position a pencil passes into the feeding mechanism between the upper edge of the lever 23 and the shoulder 19. As the operation continues the plates 18 are moved downwardly in unison until the pencil is placed between the printing cylinders, where it is engaged by the flanges 12 and 13 respectively.

Mechanism is provided to engage and prevent the pencil from moving upwardly as the plates 18 are elevated and to hold the pencil in position for printing. This engaging mechanism includes a pivoted lever 31 at each side of the machine. The levers 31 are pivotally supported on a shaft 32 located below the printing cylinders and are normally actuated away from the interval between the cylinders by springs 33. At the upper end of each of the levers 31 is a finger 34 which is adapted to move over the pencil at the time the pencil is in alinement for printing operation and thus prevent the pencil from rising with the plate 18 and levers 23 during upward movement of said parts. The forward movement of the levers 31 is imparted thereto by cams 35, each of said cams having a high face 36, which faces move the levers 31 forwardly at the proper time. The levers 31 are held in the forward position so that the fingers 34 engage over the top of the pencil during the initiation of the upward movement of the sliding plates 18. The pressure exerted on the pencil in position on the supporting arm of the levers 23 as the plates 18 move upwardly, depresses the free arm of the levers 23 sufficiently to permit the pencil to pass downwardly between the printing cylinders after the printing operation.

Below the printing cylinders and arranged in the frame of the machine is a traveling belt or apron 37 mounted over drums 38 which may be driven from any suitable source of power. The pencils discharging from the printing mechanism are caught by the apron and are moved outwardly to the end of the machine and discharged therefrom.

The mechanism for inking the mats or printing dies on the printing cylinders may be of any suitable form. In the embodiment illustrated, the inking mechanism for each of the printing cylinders comprises a revoluble horizontal inking disk 39 supported on a bracket 40 at the end of the frame. A transverse roller 41 is supported by swinging arms 42 pivoted to the frame of the machine in such manner as to oscillate the rollers over the surface of the disk. The arms 42 are actuated by links 43 connected with the eccentric disks 29 carried by the shafts 2 and 3 respectively. The inking material is transferred from the roller 41 to an intermediate roller 45 which is in permanent contact with duplicate rollers 46, the rollers 46 in turn contacting with the mat or printing die as the same is rotated therebeneath in the operation of the machine. It will be obvious that the inking material may be of different colors so that the printing impressions from the printing dies imparted to the work will be multicolor.

I am aware that the invention may find embodiment in other constructions without departing from the spirit and scope of the invention. I do not limit myself therefore to the exact construction shown and described, but what I claim and desire to secure by Letters Patent is:—

1. In a printing machine, a frame, printing cylinders supported in said frame for rotation in parallel planes, printing dies on said cylinders arranged to imprint successively on the work supported between the cylinders, mechanism for applying ink to the printing dies on said cylinders, feeding mechanism for advancing and supporting work between said cylinders to receive printing impressions from the printing dies, a lever supported by the frame independently of the feeding mechanism and normally disengaged from the work on the feeding mechanism, and means for operating said lever to engage the work to remove the work from the feeding mechanism after printing has been completed.

2. In a printing machine, a frame, printing cylinders arranged in said frame in parallel planes having their peripheries out of contact with each other, yieldable dies on said cylinders for printing on cylindrical or polygonal objects, supports for supporting the objects between the cylinders during the printing operation, and means on said cylinders for engaging said objects to hold them in position on said supports for reception of imprint from said dies.

3. In a printing machine, a frame, printing cylinders arranged in said frame in parallel planes and spaced apart to form a space between them for the objects upon which printing is being performed, supports for supporting the objects in the space between the cylinders, yieldable dies on said cylinders for printing on cylindrical or polygonal objects, means on said cylinders for engaging said objects to hold them in position on said supports for reception of imprint from said dies, and means for operating said supports to position said objects one at a time for engagement by said engaging means.

4. In a printing machine, a frame, printing cylinders arranged in said frame in parallel planes and spaced apart to form a space between them for the objects upon which printing is being performed, supports for supporting the objects in the space between the cylinders, yieldable dies on said cylinders for printing on cylindrical or polygonal objects, means on said cylinders for engaging said objects to hold them in position on said supports for reception of imprint from said dies, means for operating said supports to position said objects one at a time for engagement by said engaging means, and means for operating said supports to positions to discharge the objects.

5. In a printing machine, printing cylinders arranged to rotate on parallel axes, printing dies on said cylinders arranged to advance to the interval between the cylinders successively, movable supports for moving and holding a cylindrical object to a position and supporting said object in a position between the cylinders to receive printing impressions successively from said printing dies, and means for operating said supports to move the object to said position.

6. In a printing machine, printing cylinders arranged to rotate on parallel axes, printing dies on said cylinders arranged to advance to the interval between the cylinders successively, movable supports for moving and holding a cylindrical object to a position and supporting said object in a position between the cylinders to receive printing impressions successively from said printing dies, means for operating said supports to move the object to said position, and means for operating said supports to positions to discharge the objects.

7. In a printing machine, printing cylinders arranged to rotate on parallel axes, printing dies on said cylinders arranged to advance to the interval between the cylinders successively, movable supports for carrying and holding a cylindrical object to a position between the cylinders to receive printing impressions successively from said printing dies, means for holding the object parallel with the cylinders during the printing operation, and means for applying inking material to said printing dies.

8. In a printing machine, printing cylinders arranged to rotate on parallel axes, printing dies on said cylinders arranged to advance to the interval between the cylinders successively, movable supports for carrying and holding a cylindrical object to a position between the cylinders to receive printing impressions successively from said printing dies, means for holding the object parallel with the cylinders during the printing operation, means for applying inking material to said printing dies, and means for operating said supports to positions to discharge the objects.

9. In a printing machine, a frame, revoluble cylinders arranged parallel with each other with an interval between them, means for rotating said cylinders concurrently, a hopper for supporting the work above the cylinders, a reciprocating feeding device adapted to advance the work to the interval between the cylinders and to support the work during the printing operation, means for preventing discharge of the work from the hopper during operation of the feeding device, and means for operating said device to discharge the work from between the cylinders after the printing operation.

10. In a printing machine, a frame, revoluble cylinders arranged parallel with each other with an interval between them, printing dies arranged on said cylinders to be advanced to the interval between the cylinders successively, means for rotating said cylinders concurrently, a hopper for supporting the work above the cylinders, a reciprocating feeding device adapted to advance the work to the interval between the cylinders and to support the work during the printing operation, and means for operating said device to discharge the work from between the cylinders after the printing operation.

11. In a printing machine, a frame, revoluble cylinders arranged parallel with each other with an interval between them, printing dies arranged on said cylinders to be advanced to the interval between the cylinders successively, means for rotating said cylinders concurrently, a hopper for supporting the work above the cylinders, a reciprocating feeding device adapted to advance the work to the interval between the cylinders and support the work during the printing operation, an element removing the work from said device after the printing operation has been completed, and means for applying inking material to said dies.

12. In a printing machine, cylinders arranged parallel with each other with an interval between them, a hopper above said cylinders arranged to contain elongated cylindrical objects, a sliding support, means for operating said support to position to receive said objects successively from said hopper and then to position to support the objects between the cylinders until the printing operation has been completed, and means for holding said objects in alinement for printing impressions between said cylinders.

13. In a printing machine, a frame, printing cylinders arranged in said frame for parallel rotation, printing dies on said cylinders arranged to print successively on the work supported between the cylinders, supports for moving the work to position between the cylinders and supporting the work between the cylinders during the printing operation, and devices for removing the work from said supports after the printing operation has been completed.

14. In a printing machine, duplicate cylinders arranged parallel with each other with an interval therebetween, a hopper above said cylinders arranged to contain elongated cylindrical objects, a sliding support for receiving said objects successively from said hopper and moving the same to the interval between the cylinders, means for holding said objects in alinement for printing impressions between said cylinders, and an engaging device adapted to contact with said objects when the same are in printing position and thereby discharge said objects from the machine after the printing operation.

15. In a printing machine, printing cylinders arranged to rotate on parallel axes, printing dies on said cylinders arranged to advance to the interval between the cylinders successively, movable supports for moving and holding a cylindrical object to a position and supporting said object in a position between the cylinders to receive printing impressions successively from said printing dies, means for operating said supports to move the object to said position, means for operating said supports to positions to discharge the objects, and a movable carrier for carrying the objects from the machine.

16. In a printing machine, a shaft, a printing cylinder supported on said shaft, movable supports for moving an object to a position and supporting said object in a position to receive printing impressions from said cylinder, means for operating said supports to move the object to said position, and a device operated by said shaft for drawing the object from said supports.

17. In a printing machine, printing cylinders arranged to rotate on parallel axes, a shaft supporting one of said cylinders, printing dies on said cylinders arranged to advance to the interval between the cylinders successively, movable supports for moving the work to a position and supporting the work in a position between the cylinders to receive printing impressions successively from said printing dies, means for operating said supports to move the work to said position, and a device operated by said shaft for operating said supports to positions to discharge the work therefrom after printing has been completed.

18. In a printing machine, a pair of parallel shafts, printing cylinders mounted on said shafts, movable supports for carrying the work to and holding the work in a position between the cylinders to receive printing impressions therefrom, a lever, and connections driven by one of said shafts for actuating said lever to draw the work from said supports as an incident to movement of said supports toward their starting points.

19. In a printing machine, printing cylinders, a hopper for supporting the work above the cylinders, a reciprocating feeding device, means for moving the feeding devce to position to receive the work from said hopper and to position to support the work between the printing cylinders during the printing operation, a shaft, and a lever operated by said shaft to remove the work from said feeding device as an incident to movement of said feeding device toward position to receive the work from the hopper after each printing operation has been completed.

20. In a printing machine, revoluble cylinders arranged parallel with each other with a space between them, a hopper for supporting the work above the cylinders, a vertically reciprocating feeding device, means for actuating the feeding device to position to receive the work from said hopper and then to position to carry the work to position between the cylinders, a shaft, a cam on said shaft, and a lever operated by said cam for drawing the work from the feeding device as an incident to movement of said feeding device toward position to receive the work from said hopper.

21. In a printing machine, revoluble cylinders arranged parallel with each other with a space between them, means for rotating said cylinders concurrently, a shaft supporting one of said cylinders, a vertically reciprocating feeding device, connections from said shaft for moving said feeding device to position to receive the work, and to position to support the work between the cylinders during the printing operation, and a device operated by said shaft for drawing the work from the feeding device as an incident to movement of said feeding device toward position to receive the work from said hopper.

22. In a printing machine, two revoluble cylinders arranged parallel with each other and separated by an intervening space, means for rotating said cylinders concurrently, a hopper for supporting the work above the cylinders, a feeding device, a shaft, connections from said shaft for operating the feeding device to position to receive the work from said hopper and then to position to support the work between said cylinders during the printing operation, a cam driven by said shaft, and a device operated by said cam for removing the work from said feeding device as an incident to movement of the feeding device toward position to receive the work from said hopper.

23. In a printing machine, printing mechanism, a hopper for supporting the work above the printing mechanism, a feeding device movable to position to receive the work from the hopper and then to position to support the work in position to receive printing impressions from the printing mechanism, a shaft, connections operated by said shaft for moving the feeding device successively from position to receive the work from said hopper and to position to support the work in position to receive printing impressions from the printing mechanism, a lever, and a device driven by said shaft for actuating said lever to engage and to withdraw the work from the feeding device as an incident to movement of the feeding device toward position to receive the work from said hopper after each printing operation.

24. In a printing machine, a frame, a printing cylinder supported in said frame, a device for moving an object to a position and supporting said object in a position to receive a printing impression from said cylinder, means for moving said device to move the object to said position, a lever supported independently of said device, means for holding said lever stationary during the movement of said device to the position aforesaid, and means for operating said lever to engage the object to remove the object from said device after printing has been completed.

HARRY W. BREWER.